No. 731,477. PATENTED JUNE 23, 1903.
F. P. LIVINGSTON.
BRAKE RIGGING FOR SIX WHEELED TRUCKS.
APPLICATION FILED OCT. 18, 1902.
NO MODEL.
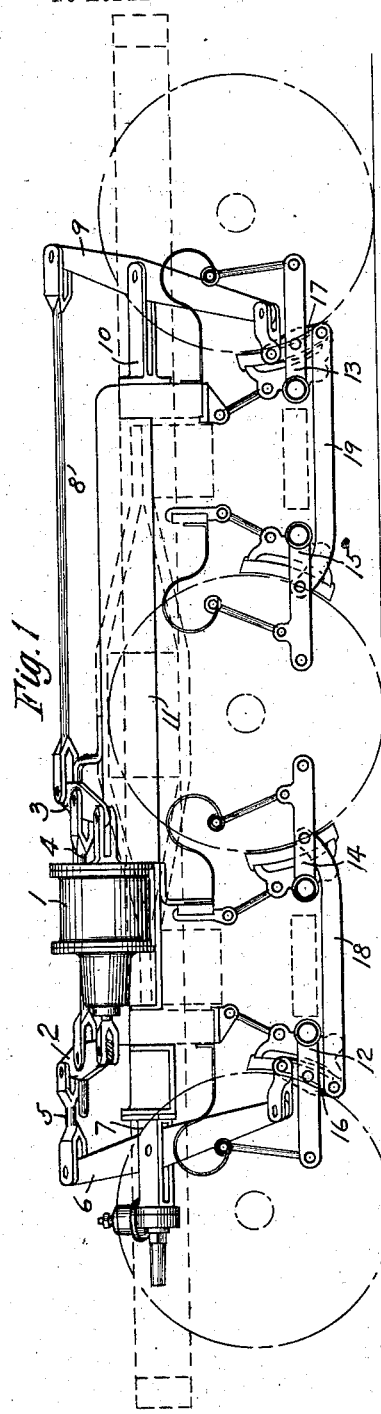
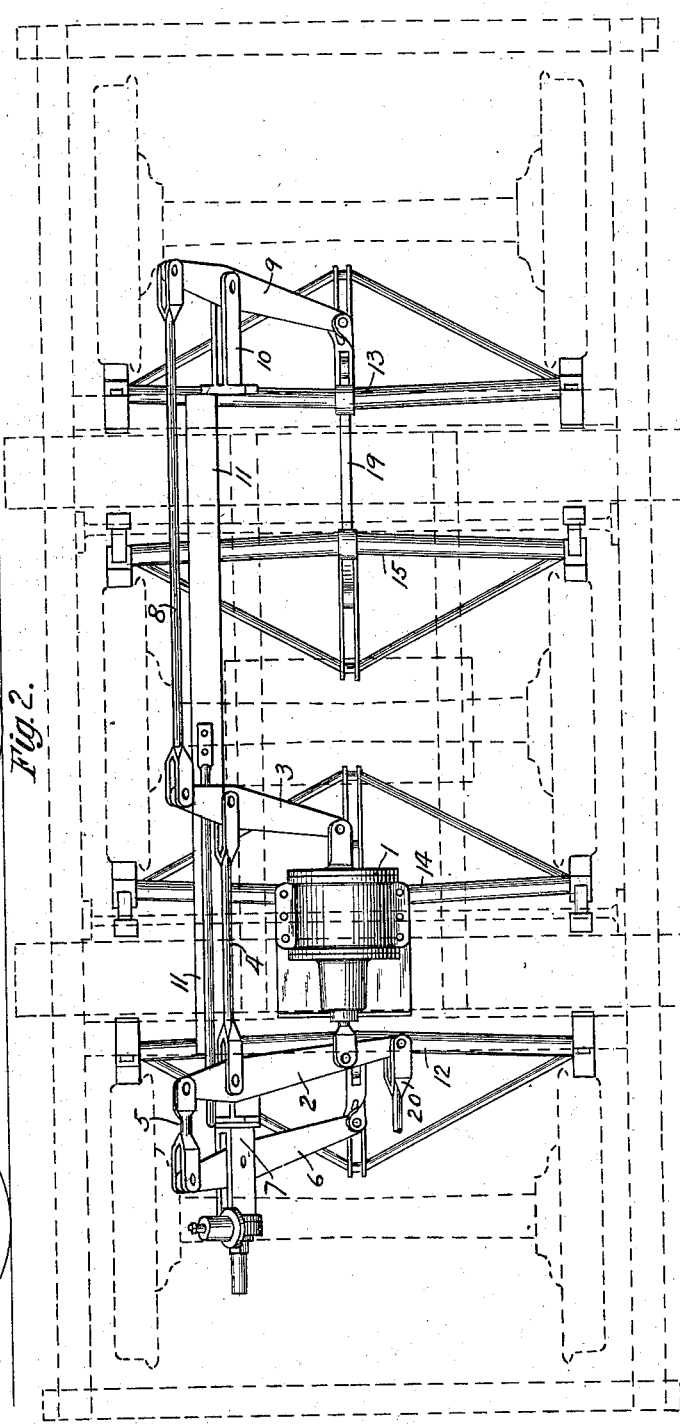
WITNESSES: INVENTOR,
Fremont P. Livingston
By E. Wright Att'y No. 731,477.    Patented June 23, 1903.

UNITED STATES PATENT OFFICE.

FREMONT P. LIVINGSTON, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

BRAKE-RIGGING FOR SIX-WHEELED TRUCKS.

SPECIFICATION forming part of Letters Patent No. 731,477, dated June 23, 1903.

Application filed October 18, 1902. Serial No. 127,805. (No model.)

*To all whom it may concern:*

Be it known that I, FREMONT P. LIVINGSTON, a citizen of the United States, residing in Wilkinsburg, in the county of Allegheny and State of Pennsylvania, have invented a certain new and useful Improvement in Brake-Rigging for Six-Wheeled Trucks, of which improvement the following is a specification.

My invention relates to brake-rigging for railway-cars, and has for its object to provide an improved form of brake-rigging especially adapted for use on six-wheeled trucks.

My invention consists in a new and improved brake-rigging for six-wheeled trucks and having brake-beams applied to both sides of the center pair of wheels and inside-hung brake-beams applied to the two outer pairs of wheels, the arrangement being such as to equalize the braking strains throughout the system, whereby all members of the truck-frame will be relieved of any such strains; and it also consists in certain novel combinations and improved features of construction, all as hereinafter more fully set forth.

In the accompanying drawings, Figure 1 is a side elevation of my improved brake-rigging as applied to a six-wheeled truck, the truck-frame being indicated in dotted lines; and Fig. 2 is a plan view of the same.

According to the construction shown in the drawings the brake-cylinder 1 is mounted on the truck-frame and provided with the usual cylinder-levers 2 and 3 and tie-rod 4. Cylinder-lever 2 is connected by rod 5 with the truck-lever 6, which is fulcrumed on a bracket or slack-adjuster 7, secured to one of the cross-beams of the truck-frame, while cylinder-lever 3 is connected by rod 8 with truck-lever 9, pivoted on fulcrum-bracket 10, secured to another cross-beam of the truck-frame. A compression-strut 11 is located between these fulcrums on the cross-beams for the purpose of relieving said beams from any bending strains due to braking. Inside-hung brake-beams 12 and 13 are applied to the outer pair of wheels, and brake-beams 14 and 15 are located on opposite sides of the center pair of truck-wheels, suitable hangers being provided for all said brake-beams.

The truck-levers 6 and 9 are pivotally connected with the upper ends of the respective brake-beam levers 16 and 17, which are fulcrumed on the brake-beams 12 and 13, respectively, of the outer pairs of wheels, and the lower ends of these brake-beam levers are connected by the respective thrust-bars 18 and 19 with the brake-beams 14 and 15 on opposite sides of the center pair of wheels. A rod 20 may be attached to the cylinder-lever 2 for the purpose of connecting the system with a hand-operated brake device, if desired.

It will now be seen that when fluid under pressure is admitted to the brake-cylinder the power will be transmitted from the cylinder-levers to the truck-levers and from these to the respective outer brake-beam levers. This will cause the upper ends of these brake-beam levers to move outwardly, thus applying the brake-beams 12 and 13 to the outer pairs of wheels and through the respective thrust-bars 18 and 19 forcing the intermediate brake-beams 14 and 15 against opposite sides of the center pair of wheels, thus exerting an equal amount of braking force on each pair of wheels and equalizing all strains throughout the system of brake-rigging.

By means of this construction a very simple and efficient brake-rigging is provided for six-wheeled trucks, and it also has the advantage of counteracting the tendency of the truck-frame to tilt due to the momentum of the car when the brakes are applied, since the dragging movement of the inside-hung brake-beams for the outer pairs of wheels acts in the opposite direction.

Having now described my invention, what I claim as new, and desire to secure by Letters Patent, is—

1. In a brake-rigging for six-wheeled trucks, the combination with inside-hung brake-beams for the outer pairs of wheels and brake-beams applied to both sides of the center pair of wheels, of brake-beam levers for said outer brake-beams and thrust-bars connecting said brake-beam levers with the respective brake-beams of the center pair of wheels.

2. In a brake-rigging for six-wheeled trucks, the combination with inside-hung brake-beams for the outer pairs of wheels and brake-beams applied to both sides of the center pair of wheels, of brake-beam levers fulcrumed on the outer brake-beams, truck-levers for operating said brake-beam levers, and thrust-bars connecting said brake-beam levers with the respective brake-beams of the center pair of wheels.

3. In a brake-rigging for six-wheeled trucks, the combination with brake-beams for each pair of wheels and brake-beam levers for the outer brake-beams, of a brake-cylinder mounted on the truck, truck-levers for operating the brake-beam levers and cylinder-levers having connection with the truck-levers.

4. In a brake-rigging for railway-trucks, the combination with brake-beams for each pair of wheels, brake-beam levers for the outer brake-beams, and truck-levers fulcrumed upon the truck-frame, of a compression-strut located between said fulcrums, a brake-cylinder and cylinder-levers for operating said truck-levers.

5. In a brake-rigging for six-wheeled trucks, the combination with inside-hung brake-beams for the outer pairs of wheels and brake-beams applied to both sides of the center pair of wheels, of brake-beam levers fulcrumed on the outer brake-beams, truck-levers connected to said brake-beam levers, a brake-cylinder and cylinder-levers for operating said truck-levers.

In testimony whereof I have hereunto set my hand.

FREMONT P. LIVINGSTON.

Witnesses:
R. F. EMERY,
JAS. B. MACDONALD.